United States Patent
Morley et al.

[11] 3,914,053
[45] Oct. 21, 1975

[54] ICE NUCLEI COUNTER

[75] Inventors: Carl H. Morley, Ridgecrest; Lohr A. Burkardt, China Lake, both of Calif.

[73] Assignee: The United States of America as represented by the Secretary of the Navy, Washington, D.C.

[22] Filed: Dec. 9, 1974

[21] Appl. No.: 530,914

[52] U.S. Cl.................. 356/37; 73/17 R; 356/114; 356/199
[51] Int. Cl.² ......................................... G01N 1/00
[58] Field of Search ............... 356/36, 37, 114, 199; 250/225, 571; 73/17 R, 25

[56] References Cited
UNITED STATES PATENTS

| 2,474,906 | 7/1949 | Meloon | 250/225 |
| 3,037,421 | 6/1962 | Bigelow et al. | 356/37 |
| 3,463,589 | 8/1969 | Skala | 356/37 |
| 3,597,084 | 8/1971 | Pagano | 356/37 |
| 3,632,210 | 1/1972 | Rich | 356/37 |

Primary Examiner—Vincent P. McGraw
Assistant Examiner—Richard A. Rosenberger

[57] ABSTRACT

An ice nuclei counter having a moving film the surface of which is coated by super cooled water. The film is moved past a port through which the ice nuclei pass, and over an ice crystal counter.

1 Claim, 1 Drawing Figure

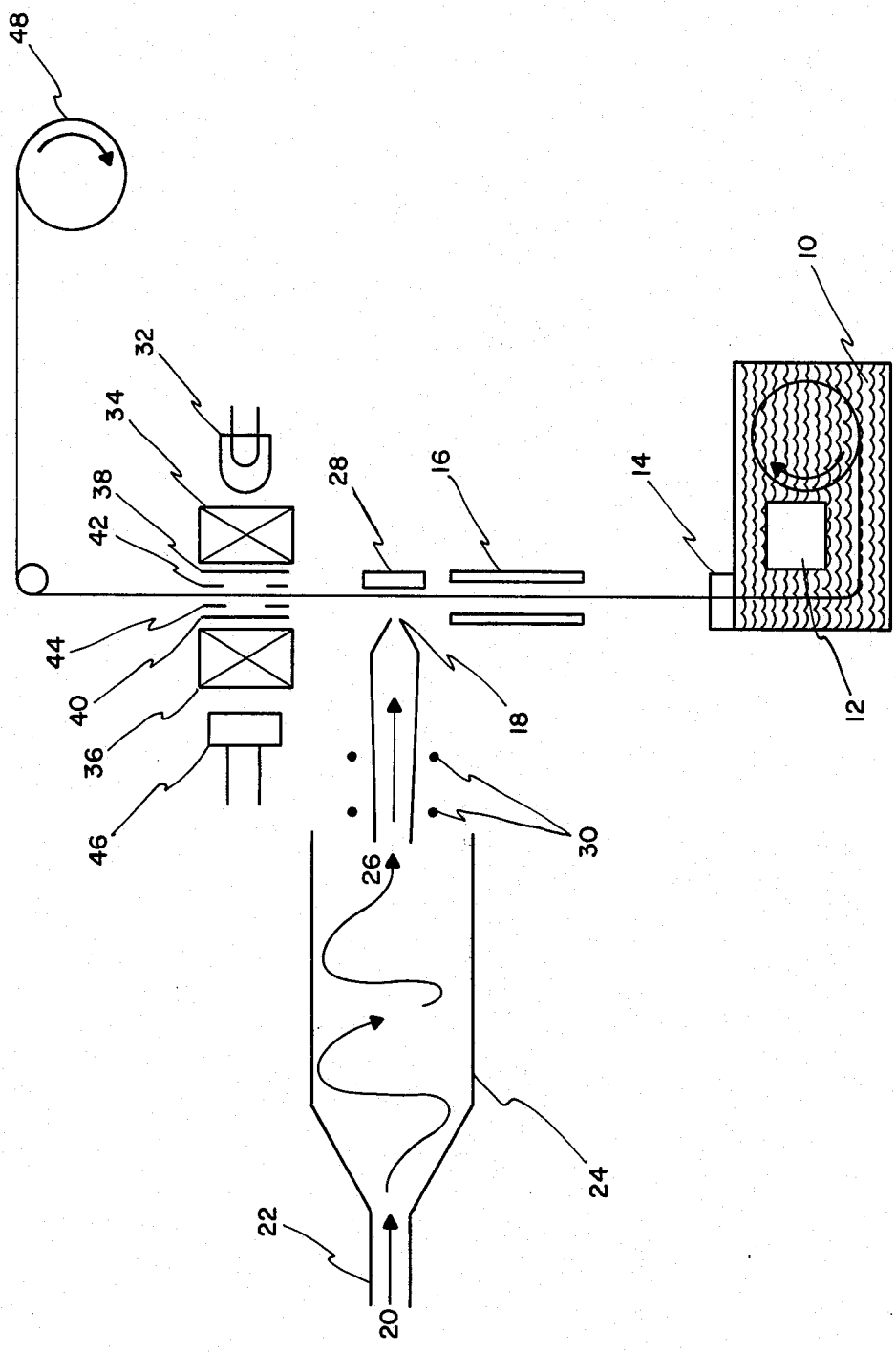

3,914,053

ICE NUCLEI COUNTER

BACKGROUND OF THE INVENTION

In the fields of meteorological research and weather modification research and efforts it is necessary to measure accurately and rapidly many cloud parameters. Of extreme importance to the successful completion of such research and efforts is the proper evaluation of the number of airborne, active ice crystal nuclei. That is, the proper evaluation of the number of nuclei which can precipitate ice crystal growth in the temperature range of −4°C to −10°C. To accomplish this measurement the equipment used must be taken to the body of air of interest, which may be high or medium altitude atmosphere requiring an airplane or other airborne craft to carry the equipment.

Most equipment used to obtain the information of interest is large and bulky, often incorporating expansion chambers specially adapted to the aircraft, or vice-versa. The general technique of most designs are similiar, with the main difference residing in the method of actual counting. In the technique employed by most approaches simple air is cooled and humidified, typically to 2°C and greater than 8.5% relative humidity. The sample is expanded into a cloud chamber where the temperature is maintained at some negative value between 0°C and −30°C, typically between −3°C and −5°C. The sample must remain in the cloud chamber long enough for ice crystals to form. The crystals are then directed to the counter. Some designs allow for continuous flow. All designs require large structures, primarily in the vertical axis, in order to allow for the dwell time in the cloud chamber. The particles fall vertically through the cloud chamber in order to not contact the walls which are continuously coated with glycerine or other "anti-freeze" to prevent icing-up. This also prevents the chamber walls from acting as nucleating agents.

The various methods of actually counting ice nuclei include a technique wherein the sample is directed against a thin foil of aluminum. Impacts in the aluminum are later manually inspected for size and number. The operator is required to differentiate between an ice particle impact and a water droplet impact. Another technique uses a cross-polorized lighting system such that ice particles, which exhibit double refraction, can be counted by a photo-detector. The technique is real-time and accurate but requires that the ice particles be at least a minimum size to be detected by the system. Another uses an acoustic sensor to detect the acoustic noise generated by ice crystals moving through a venturi. This technique is real-time but has been plagued with sensor unreliability and calibration problems Yet another technique employes an optical detector developed by Admirat. A continuous belt of polyester film is wetted by a sugar solution and drawn through the cloud chamber. The ice crystals fall on the belt and are inhibited from further growth by the sugar solution. By passing the belt over a cold plate, ice crystal growth is such that they all become nearly the same size. The ice crystals are counted by their increased light diffusion compared to the sugar solution. The primary disadvantage of this technique is that that it requires the large, heavy and bulky cloud chamber described above.

The deficiencies of all counting techniques that employ a cloud chamber are major. They include a slow response time wherein the average response time is 2 minutes for active nuclei. They require a large volume primarily due to the cloud chamber which requires approximately 3 cubic feet. They require constant maintenance to provide reasonable accurate results. And, they fail to detect many ice nuclei, primarily because ice crystals formed from contact nuclei may not grow large enough to be counted, and accretion nuclei may be dissolved in water and deactivated before cooling occurs. Therefore, to compensate, counts made from these previous techniques are always multiplied by a large compensation factor in order to represent the actual number of active nuclei believed to be in the sample.

The present invention overcomes the deficiencies of the prior systems and provides an ice nuclei counter with drastic reductions in size, weight, respone time, and required maintenance. The present invention may be used on small aircraft for conducting atmospheric research and in Automatic Meteorological Station, Airborne AN/AMQ-33 which is used in support of weather modification operations.

BRIEF DESCRIPTION OF THE DRAWING

The drawing is a plan view of the preferred embodiment of the present invention.

DESCRIPTION OF THE PREFERRED EMBODIMENT

The preferred embodiment of the present invention is shown in the drawing. Included are film supply 10 immersed in a water bath, the temperature of which is controlled by temperature controller 12 at, for example, + 2°C. In operation the film is drawn out of the bath through shutter 14 and through thermoelectric cooler 16 which additionally cools the water adhering to the film to a lower temperature, such as −5°C. The film is then exposed to ice nuclei at sample port 18.

The ice nuclei at sample port 18 are obtained from the atmosphere of interest 20 accepted by the system at ram air inlet 22. Atmospheric particles are separated as discussed below by particle separator 24 so that particles 26 provided by port 18 will be predominately within a preselected particle size range. The film opposite port 18 is backed by plate 28 which provides structural support for the film and a positive electric static charge for attracting the inherently negative charge particles 26 through port 18 and onto the film. Electrostatic accelerator 30 encircles port 18 to accelerate the particles within the port structure toward the film.

The film now carrying ice nuclei is drawn through the ice nuclei counter. The counter includes lamp 32 having a constant current source to insure continously uniform brightness, optics 34 and 36 to provide linearity, cross polarized film 38 and 40, apertures 42 and 44, and photo detector 46 which can be phototube or photo diode. The exposed film is then gathered in a conventional manner at reel 48.

The present invention operates as follows; a flexible film such as cellophane PT is used which can be wetted by water but has a smooth, clean surface that does not serve as ice nuclei. The film is passed through or stored in a supply of distilled water at approximately 2°C. A thin layer of water remains on the film as it is drawn out of the bath and through the instrument. The sheet of water is supercooled to about −5°C by cooler 16 and drawn past sample port 18 where it may be exposed to ice nuclei occuring in the atmosphere of interest. By the time exposed film is then conveyed to the ice nuclei have caused ice crystal growth in the super-cooled film of water. The counter detects and measures the occurance of ice nuclei on the film and their number. The film speed is regulated to insure that the counter speed detects individual ice crystals before they combine. The expended film accumulated at reel 48 may be disposed of, or cleaned and reused. Unobstructed ram air at receiving port 20 is sampled so that possible ice nuclei are not deflected by the air stream. The ram air is then swirled in particle separator 24 where the smallest particles are deflected to the sides on the container and the larger particles travel straight through to sample port 18. Ideally, the air is sampled where particles of the desired size, such as 0.1 to 1.0 micron, are expected to be, missing or separating out the particles greater than 1 micron or less than 0.1 micron. The enriched air is fed into an expansion chamber to slow the particles prior to sampling. An electrostatic field applied by electrostatic decelerator 30 may be employed to keep the ice crystal particles, which seem to be negatively charged, in line with sample port 18. Thereby, the sample port provides a sample having a reduced air-velocity but enriched with ice nuclei. The reduced air-velocity is necessary to prevent disturbing the sheet of water on the film. Backing plate 28 supports the water sheet and film against the air impact through sample port 18 and completes the optional electrostatic decelerator.

The ice cystal particle counter is similar to the counter provided by MEE Industries, Incorporated. The output of lamp 32 is directed through crossed polarized film 38 and 40 onto photodector 46. Liquid water is not detected by the counter. Therefore, with no ice present, photodector 46 would detect only the small constant amount of light passing through the polarizers. Ice crystals exhibit double refraction. Therefore, ice crystals on the film will cause additional light to pass through the system. Since the ice crystal is moving and within the counter for only a short period of time the counter "sees" a pulse. Thus, each ice cystal can be counted. And, since each ice crystal represents an ice nuclei the ice nuclei are counted. As an alternative, optical modules having fiberglass optics may be utilized to direct the light through viewing areas. The viewing area may be, for example, about 0.5 cm in diameter and about 0.25 cm from the sample port.

As an example only to assist in preparing the device for a specific application, lets assume the device is employed in an airborne system. Assuming aircraft velocity of 180 m/sec. at 6.1 km altitude, minimum count of 100 ice nuclei per $m^3$, or 0.1 particles/liter, 1 second response time required to collect ice nuclei and count ice crystals, and utilization of 16 mm film in which sampled width is 1 cm, then the following applies: to see one particle in one second the inlet area of receiving port 20 must be 1.8 $cm^2$. Also, to insure that ice crystal growth does not extend back over sample port 18, film speed should be approximately 12 cm/sec. This allows for a maximum count rate of 2 nuclei/liter and ice crystal size of approximately 0.5 cm, and would require 1200 feet of film per hour of operation. Because a layer of water approximately 0.004 cm deep will adhire to cellophane PT, approximately 75cc of water is required per hour of operation. The water supply must be built so that water cannot evaporate from the system during storage or spill from any aircraft position other than inverted. Shutter 14 is included for this purpose.

Care must be taken to properly heat portions of the device and cool the film for satisfactory operation. Thermoelectric cooler 16 and temperature controller 12 are employed to cool the film so that it will maintain the ice crystals deposited thereon. The walls of the expander and particle separator 24, and the lips at receiving port 20, and perhaps sample port 18, must be de-iced to maintain proper operation. Also, the heat generated by lamp 32 must be diverted, if necessary to prevent a significant increase in the temperature of the water sheet.

For convience the film and water supply could be packaged in an expendable cassette arrangement which could be preloaded at the factory. Thereby, there would be no need to service the water supply in the field. The cassette would have to be designed to account for the expansion of water on freezing and for easy heat transfer from temperature controller 12.

To those skilled in the art it will be obvious upon a study of this disclosure that the persent invention permits a variety of modifications and hence can be given embodiments other than particularly illustrated and described herein, without departing from the essential features of the invention and within the scope of the claims annexed hereto.

What is claimed is:

1. An appartus for counting ice nuclei, comprising;
an air inlet port for providing a flow of ice nuclei within a preselected range of sizes;
water wetted film;
means to supercool the wetted film;
means for moving said film past said port such that said film is in the path of said flow of ice nuclei; and
means for interrogating said film subsequent to its movement past said port to measure the number of ice crystals present in said flow, in which, each ice crystals has a very high probability of representing a single ice nuclei.

* * * * *